Oct. 31, 1950  B. CARLIN  2,527,986
SUPERSONIC TESTING

Filed April 26, 1947  2 Sheets-Sheet 1

INVENTOR.
BENSON CARLIN
BY
Joseph H. Lifschutz
ATTORNEY

Oct. 31, 1950     B. CARLIN     2,527,986
SUPERSONIC TESTING

Filed April 26, 1947     2 Sheets—Sheet 2

INVENTOR.
BENSON CARLIN
BY
ATTORNEY

Patented Oct. 31, 1950

2,527,986

UNITED STATES PATENT OFFICE 2,527,986

SUPERSONIC TESTING

Benson Carlin, New York, N. Y., assignor to Sperry Products, Inc., Hoboken, N. J., a corporation of New York Application April 26, 1947, Serial No. 744,254

7 Claims. (Cl. 73—67)

This invention relates to means for supersonic inspection of solid materials, particularly thin plates and the like, although the invention will be found to have wide and general application. It has heretofore been proposed to test solid materials by transmitting into the material a wave train of supersonic frequency and measuring the time interval which elapsed between the transmission of the wave train into the material and the receipt of its reflection either from an opposite face or from an intermediate reflecting surface such as a defect. In such cases the wave train was transmitted in a direction normal to the surface of the material. This method, however, has its limitations in certain uses particularly on thin sheets where the time interval between sending and receiving is exceptionally small and also in the case where the surface of the sheet is of such a nature, either because of its size or because there are obstructions, which renders it impossible or undesirable to move a transmitting crystal over the surface of the plate. Similarly, a system wherein two crystals are employed at an angle, one set for transmitting the wave train at an angle into the material and the other set to receive the reflection of the wave train at the angle of reflection, the two crystals being moved as a unit, the same difficulties arise in attempting to scan certain surfaces where there are roughnesses or obstructions which render the surface inaccessible.

By this invention I have provided means for testing such material not only under the conditions described above which render present methods inoperative, but which may also be used wherever present methods can be used. Briefly, it may be stated that this invention does not necessarily call for movement of the crystal over the surface of the material to be tested and requires only a single transducer which is capable of testing a strip of material in a stationary position.

It is a further object of this invention to provide, in connection with the device constituting this invention, means for transmitting the wave train into the object under test at such angle as to yield indications due solely to a single type of wave and therefore with the maximum of ease of interpretation.

It is a further object of this invention to provide a device which will be applicable to curved sheets or plates in the same manner as flat plates and which is in fact capable of testing cylindrical pipes with but a single stationary transducer for each unit of pipe length to be tested.

It is still another object of this invention to provide a device as described above in which no part of the object will remain untested by reason of failure of the wave to traverse any portion of the object under test.

Further objects and advantages of this invention will become apparent in the following detailed description thereof.

In the accompanying drawings.

Figure 3:
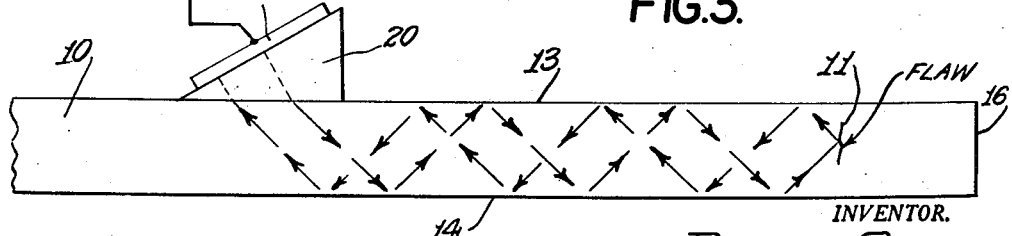
Fig. 3 is a front elevation, partly diagrammatic, illustrating the application of my invention to the testing of flat plates.
Figure 4:
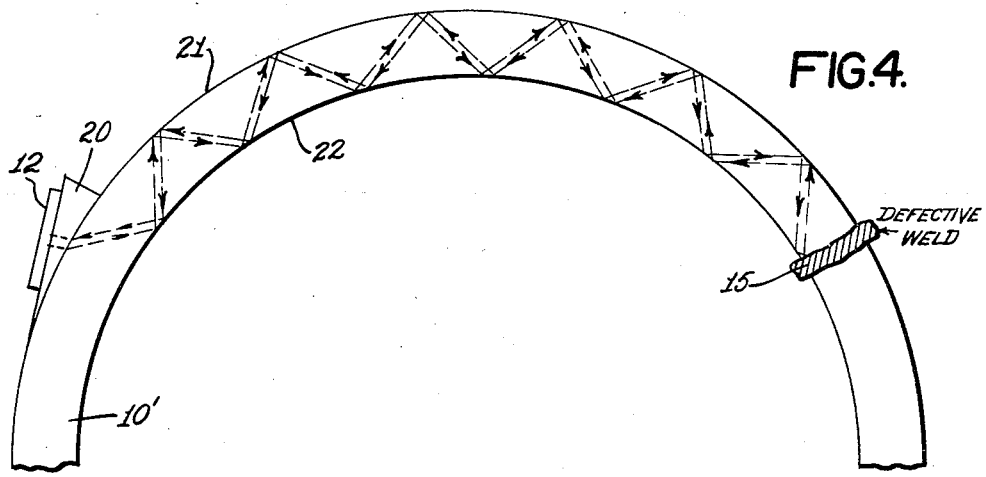
Fig. 4 is a view similar to Fig. 3 illustrating the application of my invention to the testing of curved objects, such as a portion of a pipe.

Referring first to Fig. 3 my invention is disclosed as applied to the testing of a flat plate 10. While this plate may be of any thickness, it will be found that my invention is particularly applicable to the testing of thin plates. It may be desired to test the plate for defects such as a flaw 11 distantly removed from the point at which the electro-acoustic transducer 12, which may take the form of a crystal, is applied to the surface. Instead of the flaw 11 it may be desired to test a weld between two sections of the plate, as shown, for instance, at 15 in the curved plate 10' forming the section of a pipe as shown in Fig. 4. With this invention the entire length of plate between the transducer and the opposite end wall can be tested for flaws with a single setting of the transducer for each unit length of plate to be inspected. In order to accomplish these results the electro-acoustic transducer 12 is energized from any suitable pulse or wave train generator such as, for example, the one shown in the patent to F. A. Firestone No. 2,280,226, granted April 21, 1942. The transducer 12 which may be in the form of a piezo-electric crystal is mounted on a suitable wedge 20 whose angle with respect to the surface of the plate 10 is determined by considerations to be described hereinafter. Suffice it to say that the wave train is transmitted into the object 10 through the transmitting face 13 and into the material in a direction of propagation away from the transducer. The wave train as shown by the arrows strikes the opposite face 14 of object 10 and is reflected back to the surface 13 and therefore is subjected to multiple and repeated reflections within the object 10 and between surfaces 13 and 14 until the beam strikes either the end wall 16 of plate 10 or an intermediate reflecting surface such as flaw 11. On the return path the beam is again reflected repeatedly between the surfaces 13 and 14 until it is received by wedge 20 and crystal 12. The crystal 12 may be energized by pulses from a pulse generator 40 tripped by a synchronizer 41 which is periodically energized from any suitable source of alternating current such as 60-cycle A. C. At the same time that the synchronizer trips the pulse generator it also energizes a sweep circuit 42 to generate a sweep between horizontal plates 43 of an oscilloscope 44. The pulses which are applied to crystal 12 are also applied to a receiver amplifier 45 whose output applies a signal voltage to vertical plates 46 of the oscilloscope to cause vertical deviations of the horizontal sweep. The reflections of the pulse returning to the crystal will also generate voltages which will be applied to the receiver amplifier 45 whose output will cause a vertical deviation in the horizontal sweep, spaced along the sweep a certain distance representing a time interval between the transmission of the pulse and receipt of the reflection. Thus the pulse is indicated as at 47 while the reflection of the pulse is indicated as at 48. Thus, if the time interval necessary for the wave train to travel from the crystal to end wall 16 and return is known, the receipt of a reflection in shorter time indicates the presence of a flaw or other reflecting surface.

Thus, by the use of the principle of transmitting a wave train into an object at an angle such that the wave train is directed away from the transducer and so that the wave train will be subjected to multiple reflections between the opposite surfaces of the material until a reflecting surface is struck and is then returned to the transducer by another series of multiple reflections, it is possible, with the transducer in a stationary position, to inspect a length of object in the direction of wave train propagation without moving the transducer from its stationary position.

Figure 1:
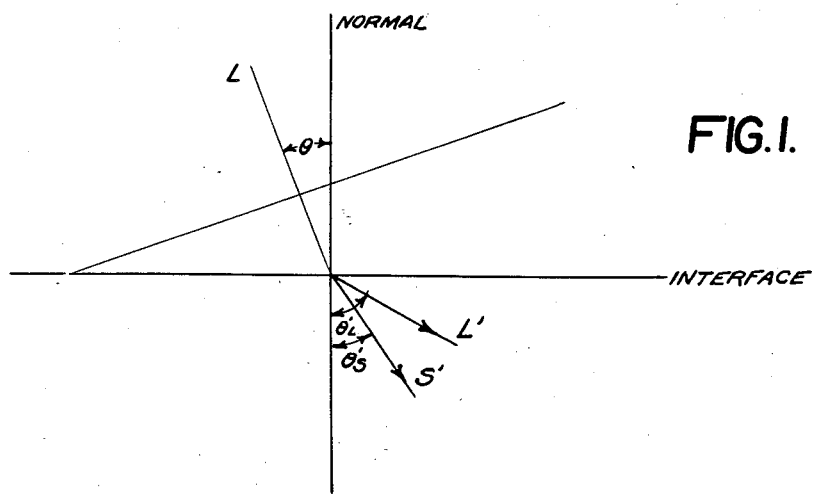
Figs. 1 and 2 are vector diagrams illustrating the theory which determines the angle at which the wave is transmitted into the object under test.
Figure 2:
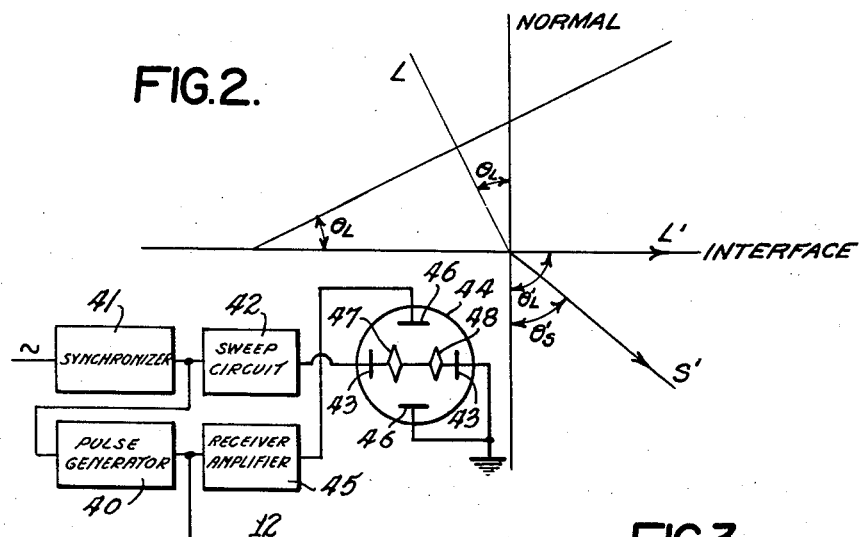

The factors which determine the proper angle of wedge 20 with respect to the surface 13 of object 10 are disclosed in the diagrammatic representation of Figs. 1, 2, 5 and 6. Referring to Fig. 1 it will be seen that if a beam L is transmitted through an interface at an angle to normal $\theta_L$ the beam will, on entering the interface, be broken into two types of waves, namely, longitudinal waves L' and shear waves S'. Since longitudinal waves have a greater velocity in solids than shear waves, the angle of refraction $\theta'_L$ will be greater than the angle of refraction of shear waves $\theta'_s$. This means that with the angle $\theta_L$ two types of waves would traverse the object 10 and a multiplicity of interfering reflections and, hence, indications would be received by the crystal 12. This is undesirable and it is preferable that one of these types of waves be eliminated. It is desirable to eliminate the longitudinal waves in object 10, first, because the greater angle of refraction of these waves makes it more readily possible to do so and, secondly, because the shear waves have desirable characteristics, such as slower rate of propagation and ability to be reflected from fluid-filled cavities, which longitudinal waves do not possess. In order to eliminate the longitudinal waves, the angle of incidence of beam L with respect to normal is increased as shown in Fig. 2 at which point the angle $\theta'_L$ is so great that the longitudinal waves reach the limiting, critical point which is the plane of surface 13 of object 10. Increasing the angle of incidence of beam L beyond this critical angle means that the longitudinal waves will pass entirely out of the object 10 and only the shear waves will remain. To achieve the critical angle, the material of wedge 20 is so chosen that its acoustic impedance is less than the acoustic impedance of object 10. This ratio of acoustic impedances will cause the longitudinal waves to be refracted in the proper direction so that they can be eliminated through the surface 13.

Only shear waves will thus be reflected in the object 10 and therefore the reflection of only a single type of wave will be obtained from any wave train. On striking the wedge 20 the shear wave is partially converted into longitudinal waves, but because of the short distance of travel in the wedge both the shear and longitudinal components of the energy reach the crystal at substantially the same time.

Therefore the angle of wedge 20 and the material of wedge 20 relative to the material of object 10 are so chosen that the angle of incidence of the wave train L exceeds the critical angle $\theta'_L$ at which the longitudinal waves will be reflected out of the object 10. Any angle may be chosen in excess of this critical angle provided it is less than the critical angle at which the shear waves are also reflected out of object 10. The area between these two critical angles gives the range of operating angle. Thus, if the wedge is of the material polystyrene incident upon steel and with a quartz transducer the range between these two critical angles is about 26° to 58°.

Figure 5:
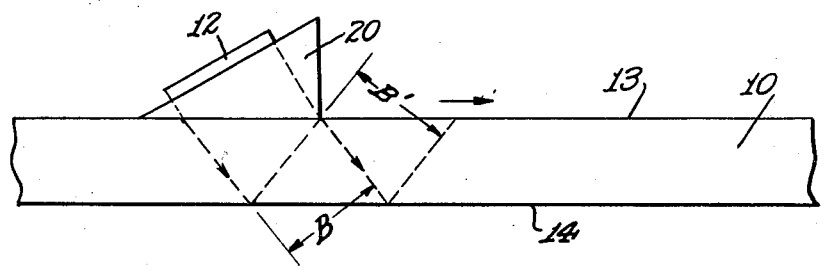
Figs. 5 and 6 are diagrams illustrating further theory which determines the angle at which the wave train is transmitted into the object under test so that no part of the object remains untested.
Figure 6:
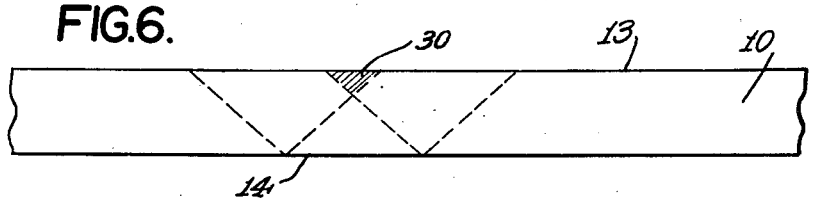

Still another factor which determines the angle of the wedge is disclosed in Figs. 5 and 6. It will be seen that the beam indicated as of width B is reflected as beam B'. If the angle of incidence is too great, there may occur the condition shown in Fig. 6 in which a section indicated at 30 will not be tested because it is not traversed by either the transmitted beam or its reflection. Such sections will occur periodically along the length of the strip of plate being tested. Therefore in determining the proper angle of wedge 20 the angle of incidence must be such that the reflection of the beam B' when it strikes surface 13 of object 10 will be substantially contiguous with the transmitted beam, and each reflection is substantially contiguous to the preceding reflection from the other surface. Thus, an angle between the two critical angles described hereinbefore is chosen which will yield the results shown in Fig. 5, i. e., the substantial elimination of skip areas. Still another consideration in determining the angle of wedge 20 is that the reflection B' should clear the base of wedge 20 otherwise a beam will be sent into the wedge and picked up by the transducer to give one or more indications as a result of such reverberations. If for some reason it is not desirable to make the angle such that the reflected beam entirely clears the wedge, then the material of the wedge should be made of absorptive material which will prevent multiple reflections within the wedge of such reverberations.

The method described hereinbefore is applicable also to the testing of curved surfaces, such as pipes, for example. Thus, the pipe 10 may be tested by means of a transducer 12 on a wedge 20' whose inner surface may be adapted to the contour of the outer surface 21 of the pipe and at such angle as to transmit the wave train into the pipe section in a direction away from transducer 12. The wave train will be repeatedly reflected between outer surface 21 and inner surface 22 until such time as it strikes a reflecting surface, such as a defective weld or a flaw, whereupon it will be reflected back to the transducer. Thus for the length of pipe traversed by the transducer a complete circumferential section can be tested with a single fixed setting of the transducer. The method and means here described are equally applicable to the testing of objects having other configuration provided only that they have opposed faces between which the transmitted wave beam can be repeatedly reflected.

Having described my invention, what I claim and desire to secure by Letters Patent is:

1. A device for inspecting an object, comprising an electro-acoustic transducer, means for vibrating the transducer at supersonic frequency and means for transmitting the vibrations from the transducer into the object entirely at a predetermined angle to normal, said last-named means comprising a wedge interposed between the object and the transducer, the wedge having a lower acoustic impedance than the object.

2. A device for inspecting an object having opposed surfaces, which comprises means for generating spaced wave trains by means including an electro-acoustic transducer, means for transmitting the wave trains through one surface of the object entirely at a pretermined angle to normal whereby the wave trains will be reflected repeatedly between said surface and the opposite surface in a direction of propagation away from the point of transmission, the returning reflections being received at the point of transmission, means responsive to the transmission of the wave train and to the returning reflections at the point of transmission, and means actuated by said responsive means for indicating the time interval between transmission of a wave train and the return of its refletion to the point of transmission from the end of the object and from any intermediate reflecting surface.

3. A device for inspecting an object having opposed surfaces, which comprises means for generating wave trains, said generating means including an electro-acoustic transducer, means for transmitting the wave trains through one surface of the object entirely at a predetermined angle to normal whereby the wave trains will be reflected repeatedly between said surface and the opposite surface in a direction of propagation away from the point of transmission, the returning reflections being received at the point of transmission by the same transducer, means responsive to the transmission of the wave train and to the returning reflections at the point of transmission, and means actuated by said responsive means for indicating the time interval between transmission of a wave train and the return of its reflection to the transducer from the end of the object and from any intermediate reflecting surface.

4. A device for inspecting an object having opposed surfaces, which comprises means for generating wave trains, said generating means including an electro-acoustic transducer, and means for transmitting the wave trains through one surface of the object entirely at a predetermined angle to normal whereby the wave trains will be reflected repeatedly between said surface and the opposite surface in a direction of propagation away from the point of transmission, said angle being greater than the critical angle at which the longitudinal waves disappear from the object but less than the critical angle at which shear waves disappear from the object whereby only shear waves will be transmitted in the object, the returning reflections being received at the point of transmission.

5. A device for inspecting an object having opposed surfaces, which comprises means for generating wave trains, said generating means including an electro-acoustic transducer, and means for transmitting the wave trains through one surface of the object entirely at a predetermined angle to normal whereby each wave train will be reflected repeatedly between said surface and the opposite surface in a direction of propagation away from the point of transmission, said angle being greater than the critical angle at which the longitudinal waves disappear from the object but less than the critical angle at which the shear waves disappear from the object whereby only the shear waves will be transmitted in the object, said angle being such that the reflections of the wave train from the opposite surfaces overlap each other sufficiently to substantially eliminate untested areas, and the returning reflections being received at the point of transmission.

6. A device for inspecting an object having opposed surfaces, which comprises means for generating wave trains, said generating means including an electro-acoustic transducer, means for transmitting the wave trains through one surface of the object entirely at a predetermined angle to normal whereby the wave trains will be reflected repeatedly between said surface and the opposite surface in a direction of propagation away from the point of transmission, said angle being such that the reflection of the wave trains from the opposite surface strike the transmitting surface so as substantially to clear the transducer, said angle being greater than the critical angle at which the longitudinal waves disappear from the object but less than the critical angle at which shear waves disappear from the object, whereby only shear waves will be transmitted in the object, the returning reflections being received at the point of transmision by the same transducer.

7. A device for inspecting an object having opposed surfaces, which comprises means for generating wave trains by means including an electro-acoustic transducer, means for transmitting the wave trains through one surface of the object entirely at a predetermined angle to normal whereby the wave trains will be reflected repeatedly between said surface and the opposite surface in a direction of propagation away from the point of transmission, said angle being such that the reflection of the wave trains from the opposite surface strike the transmitting surface so as substantially to clear the transducer, said angle being greater than the critical angle at which the longitudinal waves disappear from the object but less than the critical angle at which shear waves disappear from the object, whereby only shear waves will be transmitted in the object, said angle being such that the reflections of the wave train from the opposite surfaces overlap each other sufficiently to substantially eliminate untested areas.

BENSON CARLIN.

REFERENCES CITED

The following references are of record in the file of this patent:

UNITED STATES PATENTS

| Number | Name | Date |
|---|---|---|
| 2,280,226 | Firestone | Apr. 21, 1942 |
| 2,463,328 | Sproule | Mar. 1, 1949 |

FOREIGN PATENTS

| Number | Country | Date |
|---|---|---|
| 569,598 | Germany | Feb. 4, 1933 |
| 342,219 | Great Britain | Jan. 29, 1931 |